United States Patent
Nagasaki et al.

(10) Patent No.: US 10,823,922 B2
(45) Date of Patent: *Nov. 3, 2020

(54) OPTICAL CONNECTOR CABLE AND METAL MEMBER

(71) Applicant: SUMITOMO ELECTRIC INDUSTRIES, LTD., Osaka (JP)

(72) Inventors: Taisuke Nagasaki, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,829

(22) Filed: May 7, 2019

(65) Prior Publication Data

US 2019/0353860 A1 Nov. 21, 2019

(30) Foreign Application Priority Data

May 18, 2018 (JP) .................................. 2018-096280

(51) Int. Cl.
*G02B 6/44* (2006.01)

(52) U.S. Cl.
CPC ......... *G02B 6/4429* (2013.01); *G02B 6/4477* (2013.01); *G02B 6/4416* (2013.01)

(58) Field of Classification Search
CPC ... G02B 6/4429; G02B 6/4471; G02B 6/4477
See application file for complete search history.

(56) References Cited

U.S. PATENT DOCUMENTS

| 4,447,120 A * | 5/1984 | Borsuk | G02B 6/4471 385/136 |
| 4,948,222 A * | 8/1990 | Corke | G02B 6/3889 385/100 |
| 5,166,997 A | 11/1992 | Norland et al. | |

(Continued)

FOREIGN PATENT DOCUMENTS

| JP | 2013-152420 A | 8/2013 |
| JP | 2014-38272 A | 2/2014 |

OTHER PUBLICATIONS

Office Action dated Dec. 16, 2019 that issued in U.S Appl. No. 16/404,840.

(Continued)

*Primary Examiner* — Daniel Petkovsek
(74) *Attorney, Agent, or Firm* — Faegre Drinker Biddle & Reath LLP (57) ABSTRACT

An optical connector cable comprising an optical cable and a metal member is disclosed. The optical cable includes an optical fiber, a tensile strength body, and a jacket. The optical fiber extends along a first direction. The tensile strength body is provided along the optical fiber. The jacket surrounds the optical fiber and the tensile strength body in a circumferential direction. The optical fiber and the tensile strength body extend outside from an end of the jacket along the first direction. The metal member has a winding structure around which the tensile strength body extending outside from the end of the jacket is wound. The winding structure of the metal member is positioned outside from the end of jacket along the first direction.

15 Claims, 10 Drawing Sheets

(56) References Cited

U.S. PATENT DOCUMENTS

| | | | | |
|---|---|---|---|---|
| 6,389,214 B1* | 5/2002 | Smith | ................ | G02B 6/3878 |
| | | | | 385/136 |
| 7,093,984 B2* | 8/2006 | Cox | .................... | G02B 6/3887 |
| | | | | 385/86 |
| 8,039,745 B2 | 10/2011 | Sedor et al. | | |
| 8,172,465 B2* | 5/2012 | Kleeberger | .......... | G02B 6/4472 |
| | | | | 385/134 |
| 8,816,222 B2 | 8/2014 | Pimentel | | |
| 9,116,310 B2 | 8/2015 | Bran De Leon et al. | | |
| 9,256,040 B2* | 2/2016 | Arao | .................... | G02B 6/4403 |
| 9,383,532 B2 | 7/2016 | Yokochi | | |
| 10,627,590 B2* | 4/2020 | Wen | .................... | G02B 6/4476 |
| 2010/0158452 A1 | 6/2010 | Takahashi et al. | | |
| 2014/0241674 A1 | 8/2014 | Isenhour et al. | | |
| 2015/0010282 A1* | 1/2015 | Yokochi | ............... | G02B 6/4477 |
| | | | | 385/102 |
| 2019/0353860 A1 | 11/2019 | Nagasaki et al. | | |
| 2019/0353861 A1* | 11/2019 | Nagasaki | ............. | G02B 6/4471 |

OTHER PUBLICATIONS

Office Action dated Feb. 3, 2020 that issued in U.S. Appl. No. 16/404,840.

U.S. Office Action dated May 7, 2020 issued in U.S. Appl. No. 16/404,840.

Office Action dated Aug. 10, 2020 that issued in U.S. Appl. No. 16/404,840.

* cited by examiner

OPTICAL CONNECTOR CABLE AND METAL MEMBER

CROSS REFERENCE

The present application is based upon and claims the benefit of the priority from Japanese patent application No. 2018-096280, filed on May 18, 2018, the entire contents of which are incorporated herein by reference.

TECHNICAL FIELD

The present disclosure relates to an optical connector cable and a metal member.

BACKGROUND

JP2013-152420A and JP2014-038272A respectively disclose an optical module in which a tensile strength fiber is provided in an optical cable for distributing tensile forces applied to the optical cable. The respective optical modules are provided with the tensile strength fiber along the optical fibers to apply proper tension to the tensile strength fiber, and therefore, an end of the tensile strength fiber is fixed at an end of the optical cable by a terminal fixture.

SUMMARY

The present disclosure provides an optical connector cable. The optical connector cable includes an optical cable and a metal member. The optical cable includes an optical fiber, a tensile strength body, and a jacket. The optical fiber extends in a first direction. The tensile strength body is provided along the optical fiber. The jacket surrounds the optical fiber and the tensile strength body in a circumferential direction. The optical fiber and the tensile strength body extend outside from an end of the jacket along the first direction. The metal member has a winding structure around which the tensile strength body extending outside from the end of the jacket is wound. The winding structure of the metal member is positioned outside from the end of jacket along the first direction.

The present disclosure also provides a metal member. The metal member includes a swaging structure, a coupling portion, and winding structure. The swaging structure has a circular-shaped or U-shaped cross-section, and extends along a first direction. The coupling portion is coupled to an end of the swaging structure, and extends along the first direction. The winding structure has a plate-shaped portion extending in a second direction intersecting the first direction, and is coupled to an end of the coupling portion opposite to the swaging structure. At least one of a cutout and a recess is provided to the plate-shaped portion of the winding structure.

BRIEF DESCRIPTION OF THE DRAWINGS

The foregoing and other purposes, aspects and advantages will be better understood from the following detailed description of embodiments of the invention with reference to the drawings, in which.

DETAILED DESCRIPTION

Problem to be Solved by the Present Disclosure

The terminal fixture described in JP2013-152420A can reliably fix the tensile strength fibers to the cable. However, portions of the terminal fixture on which the tensile strength fibers are wound are bent backward at 90-degree angles after the winding, and the portions are used for the swaging to the cable. For this reason, tensions applied to the tensile strength fibers when the winding is performed in the terminal fixture may increase or decrease owing to works thereafter, and therefore, the tensions to the tensile strength fibers may vary for each product when assembling the optical module. The terminal fixture described in JP2014-038272A folds back the tensile strength fibers and a ring is swaged on an outer periphery of the optical cable so as to fix tensile strength fibers. Thus, the tensions to the tensile strength fibers may vary for each product. For this reason, a terminal fixture capable of stabilizing the tensions to the tensile strength fibers for each product when assembled in the product has been desired to be achieved.

Advantageous Effects of the Present Disclosure

According to the present disclosure, a tension to tensile strength body of an optical cable can be stabilized for each product.

DESCRIPTION OF EMBODIMENTS OF THE PRESENT DISCLOSURE

Embodiments of the present disclosure are listed and described. An optical connector cable according to one embodiment of the present disclosure includes an optical cable and a metal member. The optical cable includes an optical fiber, a tensile strength body, and a jacket. The optical fiber extends in a first direction. The tensile strength body is provided along the optical fiber. The jacket surrounds the optical fiber and the tensile strength body in a circumferential direction. The optical fiber and the tensile strength body further extend outside from an end of the jacket along the first direction. The metal member has a winding structure around which the tensile strength body extending outside from the end of the jacket is wound. The winding structure of the metal member is positioned outside from the end of jacket along the first direction.

In this optical connector cable, a winding structure that winds an extending portion of the tensile strength body of the optical cable is provided to the metal member, and the winding structure is positioned outside from the end of jacket of the optical cable along the first direction. Since this embodiment positions the winding structure in a direction toward which the tensile strength body extends outside from the end of the jacket, and directly wind the tensile strength body on the winding structure without applying an unnecessary external force to the winding structure after the winding, the tension to the tensile strength body of the optical cable is easy to stabilize for each product. In other words, the tension to the tensile strength body can be prevented from varying for each product in the optical connector cable. In addition, since this embodiment positions the winding structure directly outside from the end of the jacket along the first direction, the work of winding the tensile strength body on the metal member can be easily made, which makes it easier to set the tension to the tensile strength body to a desired value. Furthermore, according to the optical connector cable, an optical connector cable can be stably provided in which the optical fiber is preferably protected by the tensile strength body to which a desired tension is applied.

As one embodiment, the tensile strength body may be wound around the winding structure such that at least a part of the tensile strength body is substantially parallel to the first direction. Since the tensile strength body is easy to wind around the winding structure in this embodiment, the tension to the tensile strength body can be easily set to a desired value. The phrase "substantially parallel" herein refers to a case where an angle to the first direction is in a range of ±5 degree-angle.

As one embodiment, the tensile strength body may be wound around the winding structure such that at least a part of the tensile strength body intersects the first direction. This embodiment prevents the tensile strength body from coming loose or the like when the tensile strength body is wound around the winding structure such that the tensile strength body can be more reliably (without displacement) held on the winding structure. As a result, the tension to the tensile strength body can be more easily set to a desired value. The phrase "intersect" herein is not limited thereto, but an angle of 20 degrees to 70 degrees to the first direction is included and a right angle such as an angle of 90 degrees to the first direction may be included. A part of the tensile strength body may be wound around the winding structure to be substantially parallel to in the first direction, and another part of the tensile strength body may be wound around the winding structure to intersect the first direction.

As one embodiment, the winding structure may include a plate-shaped part. The plated-shaped part may be provided with at least one of a cutout and a recess. This embodiment with the cutout or the recess can hold the tensile strength body on the winding structure of the metal member using a simple configuration. The winding structure may extend along the first direction and a second direction intersecting the first direction.

As one embodiment, the metal member may include a swaging structure and a coupling portion. The swaging structure is configured to fix the metal member to the optical cable. The coupling part couples the swaging structure to the winding structure. The swaging structure, the coupling portion, and the winding structure may be provided in this order along the first direction. Since this embodiment is provided with the winding structure and the swaging structure as individual member, the tension to the tensile strength body wound around the metal member is prevented from varying caused in association with a work of swaging the metal member to the optical cable. Therefore, this embodiment can further stabilize the tension to the tensile strength body of the optical cable for each product.

In the above embodiment, the swaging structure may have a circular-shaped or U-shaped cross-section. This swaging structure can easily attach the metal member to the optical cable. In addition, since the metal member can be easily attached to the optical cable, variation of the tension to the tensile strength body wound around the metal member can be prevented.

In the above embodiment, the coupling portion may be coupled to an end of the swaging structure, and the coupling portion may extend along the first direction. The coupling portion may extend with a slop toward the central axis of the optical cable along the first direction.

In the above embodiment, the winding structure may include a winding main body, a pair of projecting portions, and a beam portion. The winding main body is connected to the coupling portion and extends along a second direction intersecting the first direction. The pair of projecting portions are respectively provided to both ends of the winding main body in the second direction. The beam portion is connected to the winding main body opposite to the coupling portion through a juncture portion. The beam portion extends along the second direction to be longer than the juncture portion. In addition, respective through-holes may be provided with the pair of projecting portions. The thorough-holes respectively extends along a third direction intersecting the first direction and the second directions As one embodiment, the optical cable connector may further comprise a resin member that surround an end of the optical cable and the metal member. Since the tensile strength body wound around the metal member is also surrounded by the resin member, this embodiment prevents the tension to the tensile strength body from varying over time, and therefore, can further stabilize the tension to the tensile strength body of the optical cable. Such a resin member is not limited to this, but can be molded by casting a molten resin around the metal member or the like using a mold, for example, and therefore, can be created without affecting the tension to the tensile strength body wound around the metal member.

As one embodiment, the optical cable may further include other optical cable, and the resin member may hold the optical fiber and the other optical fiber so as to identify respective locations of the optical fiber and the other optical fiber. Since this embodiment defines a location of each optical fiber by the resin member, positioning of each optical fiber with respect to another member can be easily achieved.

As one embodiment, the optical cable may further include a plurality of electric wires, and the resin member may hold the plurality of electric wires so as to identify respective locations of the plurality of electric wires. Since this embodiment defines a location of each electric wire by the resin member, positioning of each electric wire with respect to another member can be easily achieved.

A metal member according to another embodiment of the present disclosure includes a swaging structure, a coupling portion, and a winding structure. The swaging structure has a circular-shaped or U-shaped cross-section, and extends along a first direction. The coupling portion is coupled to an end of the swaging structure, and extends along the first direction. The winding structure has a plate-shaped portion extending in a second direction intersecting the first direction, and is coupled to an end of the coupling portion opposite to the swaging structure. At least one of a cutout and a recess is provided to the plate-shaped portion of the winding structure.

DETAIL OF EMBODIMENTS OF THE PRESENT DISCLOSURE

Specific examples of an optical connector cable and a metal member according to an embodiment of the present disclosure will be described with reference to the drawings below. The invention is not limited to the illustrations but is defined by claims, and is intended to include any modification within the meaning and scope equivalent to the claims. In the following description, the same components are designated by the same reference numerals and overlapped description will be omitted.

Figure 1:
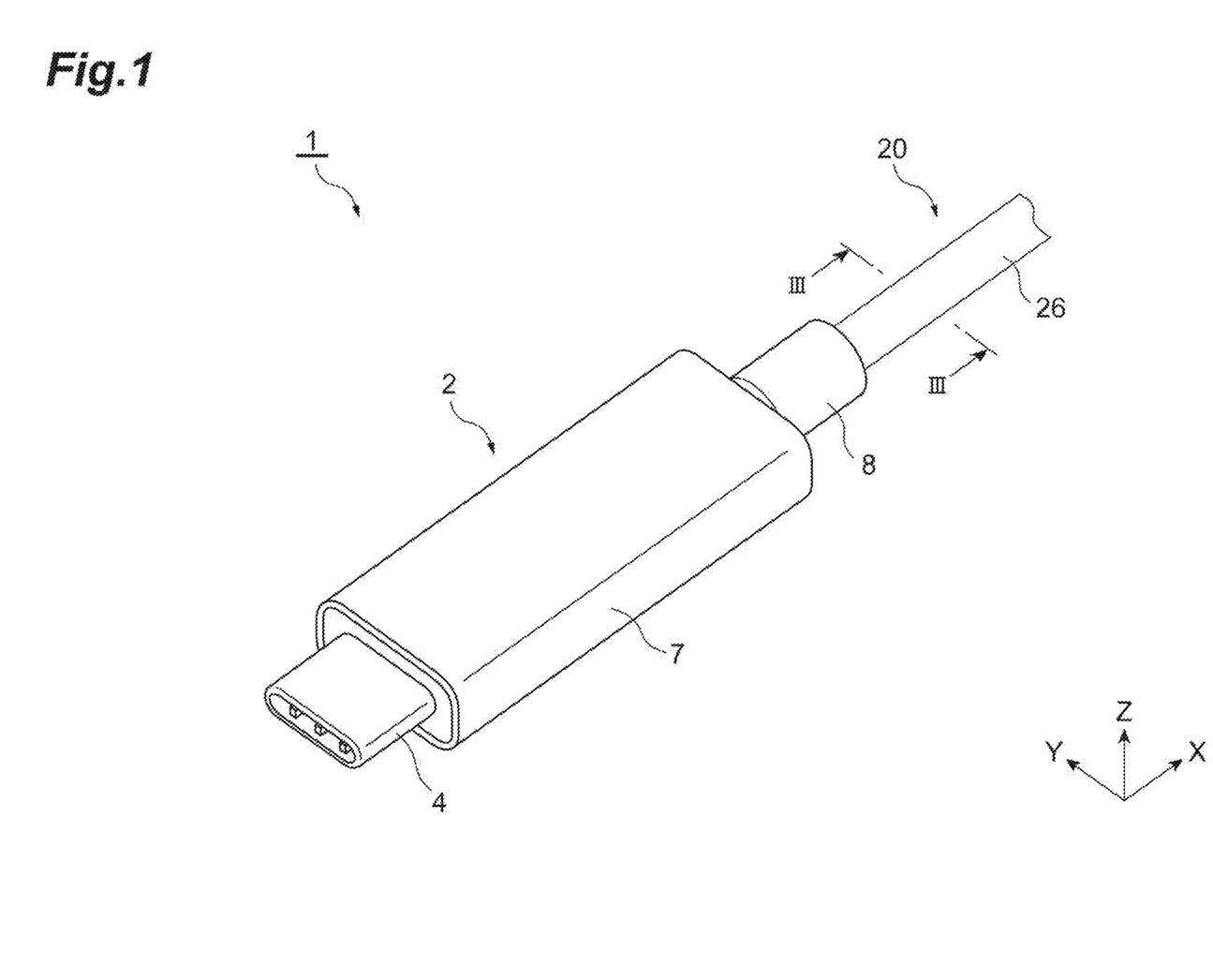
FIG. 1 is a perspective view illustrating an embodiment of an optical connector cable.
Figure 2:
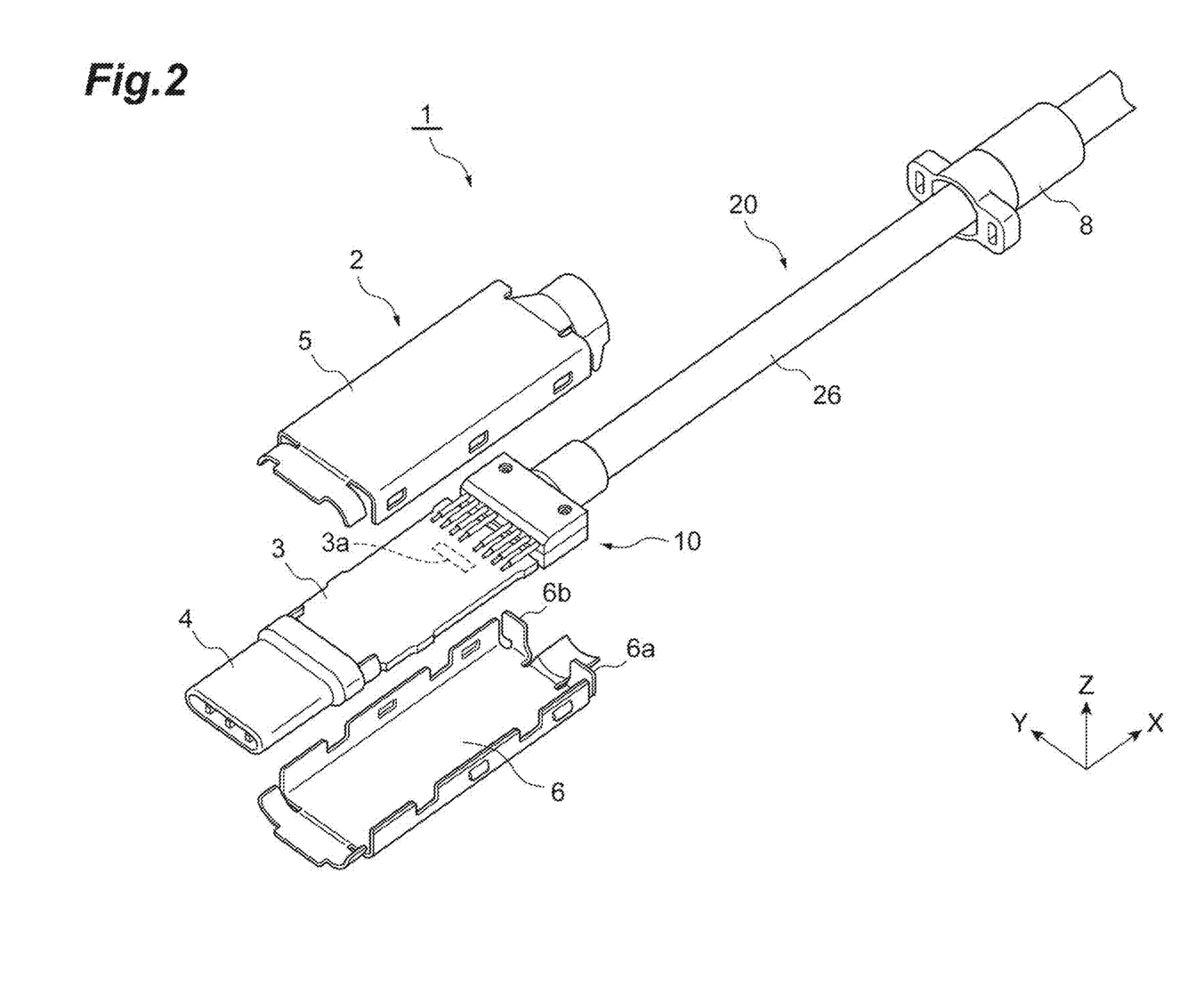
FIG. 2 is an exploded perspective view of the optical connector cable illustrated in FIG. 1.

An optical connector cable 1 is described referring to FIG. 1 and FIG. 2. FIG. 1 is a perspective view illustrating an embodiment of an optical connector cable. FIG. 2 is an exploded perspective view of the optical connector cable illustrated in FIG. 1. As illustrated in FIG. 1 and FIG. 2, the optical connector cable 1 includes a connector module 2 and an optical cable 20. The connector module 2 is connected to an end of the optical cable 20. The connector module 2 has a function to convert respective optical signals from the optical cable 20 into respective electrical signals to output the converted signals to outside and convert respective electrical signals from the outside into respective optical signals to output the converted signals to the optical cable 20. The connector module 2 includes a circuit board 3, at least one photoelectric conversion element 3a, a connector 4, housing members 5 and 6, a boot 7, a sealing member 8, and a terminal fixture 10. In FIG. 2, illustration of the boot 7 is omitted. As one example, the connector module 2 may have a plurality of photoelectric conversion elements 3a, such as four photoelectric conversion elements 3a.

The photoelectric conversion element 3a is a light emitting element such as a vertical cavity surface emitting laser (VCSEL) or a light receiving element such as a photodiode (PD). The photoelectric conversion element 5 is mounted on the circuit board 3. The optical cable 20 connects with one end of the circuit board 3, and the connector 4 connects with the other end of the circuit board 3. The photoelectric conversion element 3a converts the optical signal transmitted from the optical cable 20 into the electrical signal, and the connector 4 outputs the electrical signal to the outside. On the other hand, the electrical signal input from the outside is input via the connector 4 and wiring on the circuit board 3 to the photoelectric conversion element 3a. The photoelectric conversion element 3a convers the electrical signal into the optical signal and inputs the optical signal to the optical cable 20.

The housing members 5 and 6 are a member made of a metal (e.g., made of SUS) and housing the circuit board 3, a part of the terminal fixture 10, and an end of the optical cable 20 therein. The housing members 5 and 6 are provided to sandwich the circuit board 3 therebetween in a vertical direction. The housing member 5 has a pair of lateral walls extending along an X-axis direction and a lateral wall perpendicular to the X-axis direction and provided near the end of the optical cable 20. The housing member 6 has a pair of lateral walls extending along an X-axis direction and lateral walls 6a and 6b perpendicular to the X-axis direction and provided near the end of the optical cable 20. That is, the circuit board 3, a part of the terminal fixture 10, and the end of the optical cable 20 are housed in a state of being surrounded by the lateral walls and bottom walls of the housing members 5 and 6. The boot 7 is a member made of a resin, and covering the housing members 5 and 6 and the end of the optical cable 20. The sealing member 8 is a member made of a resin and housed at ends of the housing members 5 and 6 adjacent to the optical cable 20 to seal a partial gap generated in a state that the housing members 5 and 6 mate with each other.

The optical cable 20 is a cable housing most of the optical fibers 21 therein and exposing a leading end of the optical fibers 21 to the outside. The optical cable 20 extends along the X-axis direction. The end of the optical cable 20 is provided with the terminal fixture 10. The terminal fixture 10 is described in detail later. The other end of the optical cable 20 may be provided with a similar terminal fixture 10.

Figure 3:
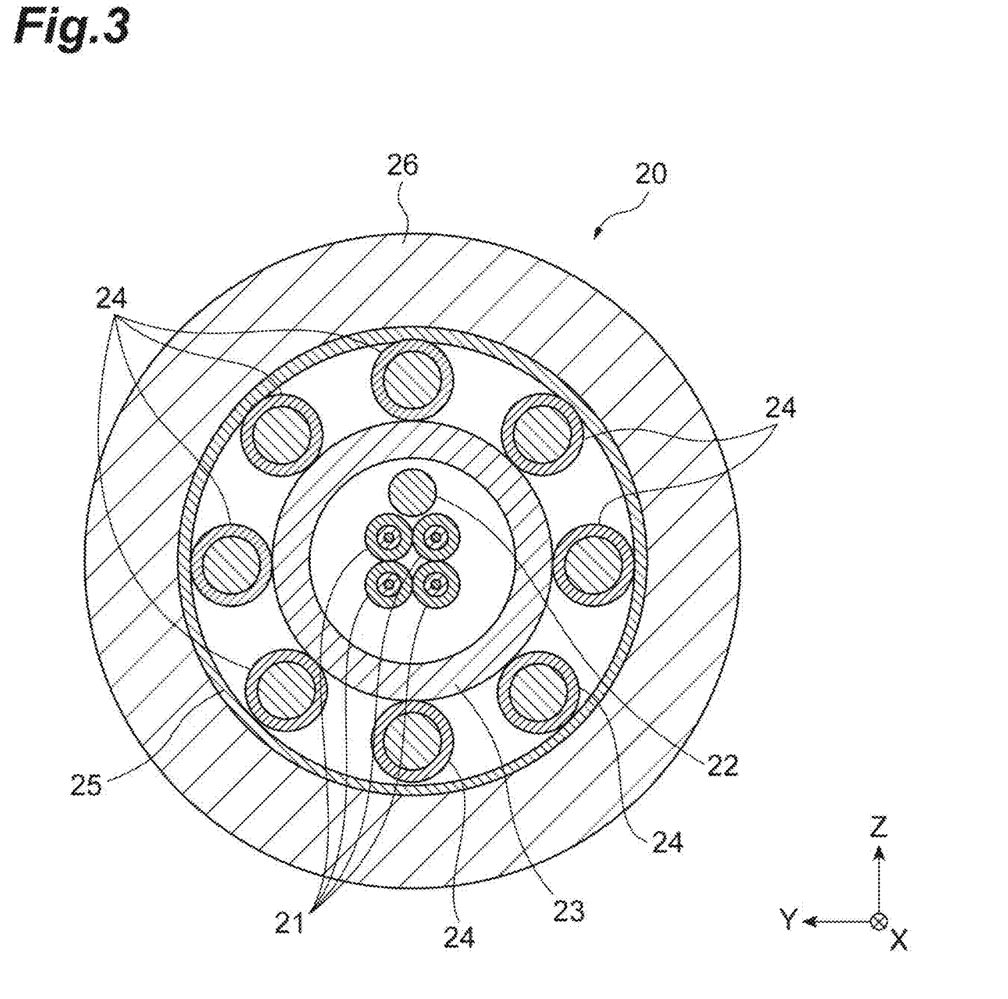
FIG. 3 is a cross-sectional view of an optical cable along a line in the optical connector cable illustrated in FIG. 1.
Figure 4:
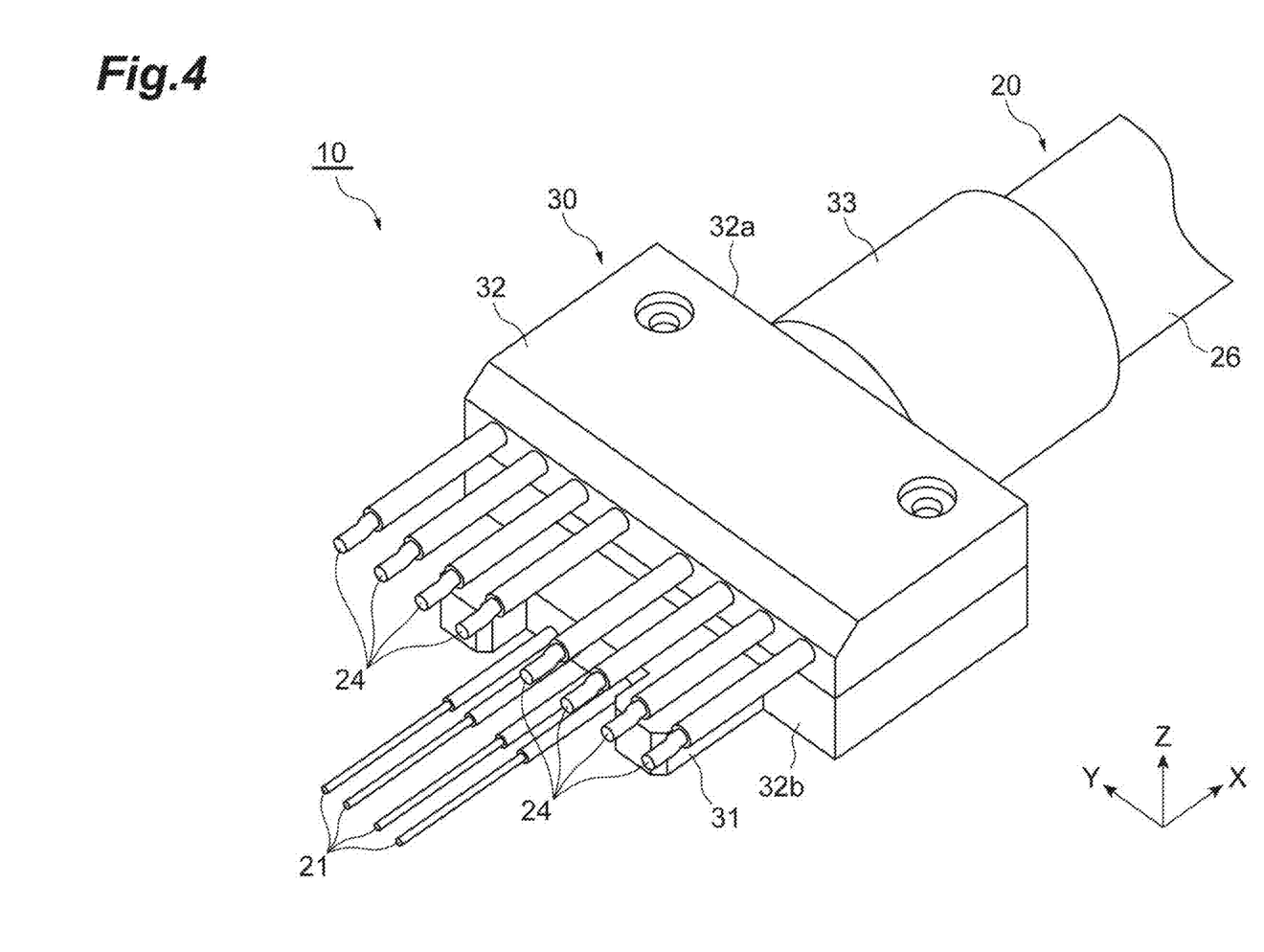
FIG. 4 is a perspective view illustrating a terminal structure of an optical cable provided with a terminal fixture.
Figure 5:
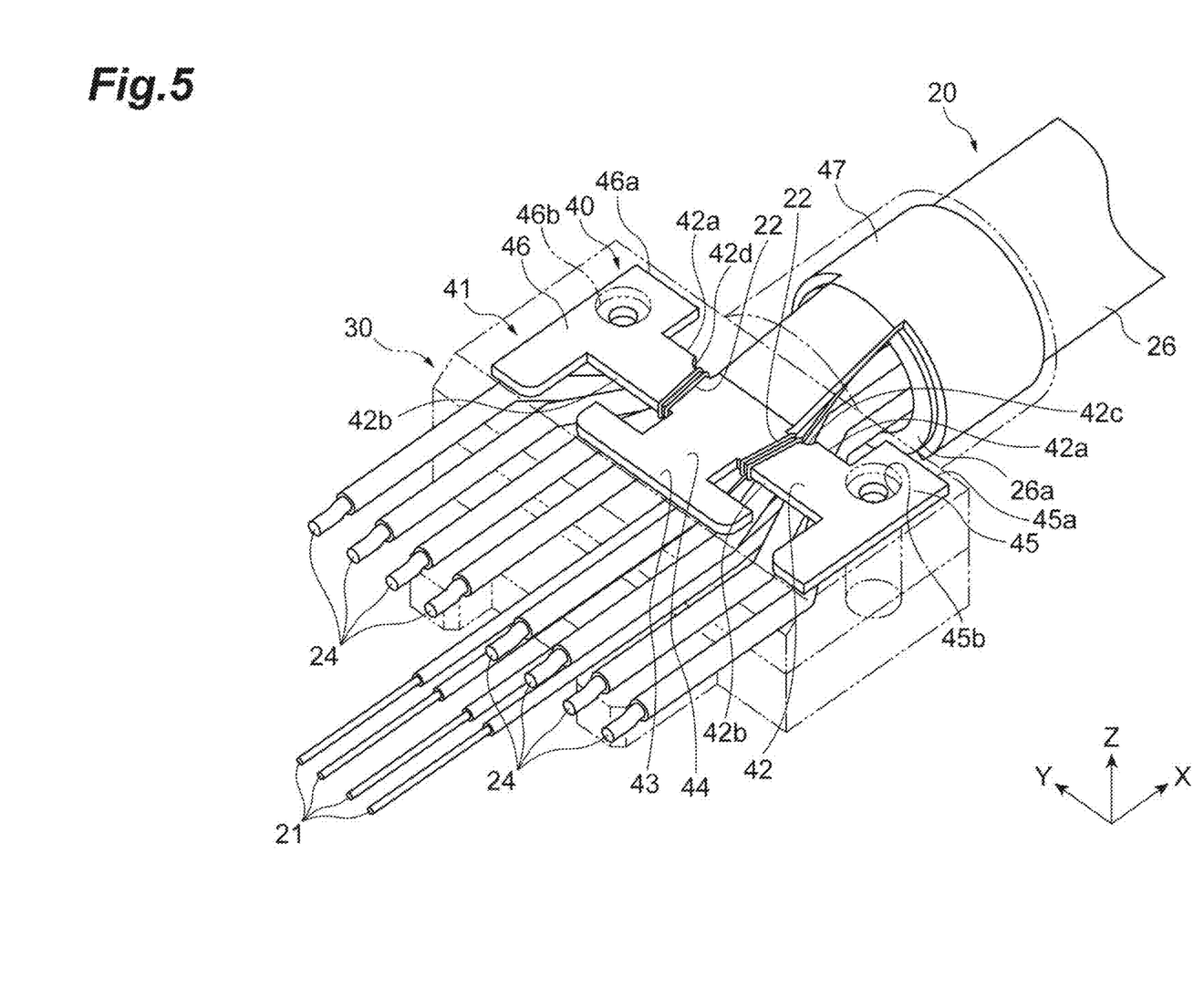
FIG. 5 is a perspective view of the terminal structure of the optical cable illustrated in FIG. 4 with a resin member being depicted by a dotted line.
Figure 6A:
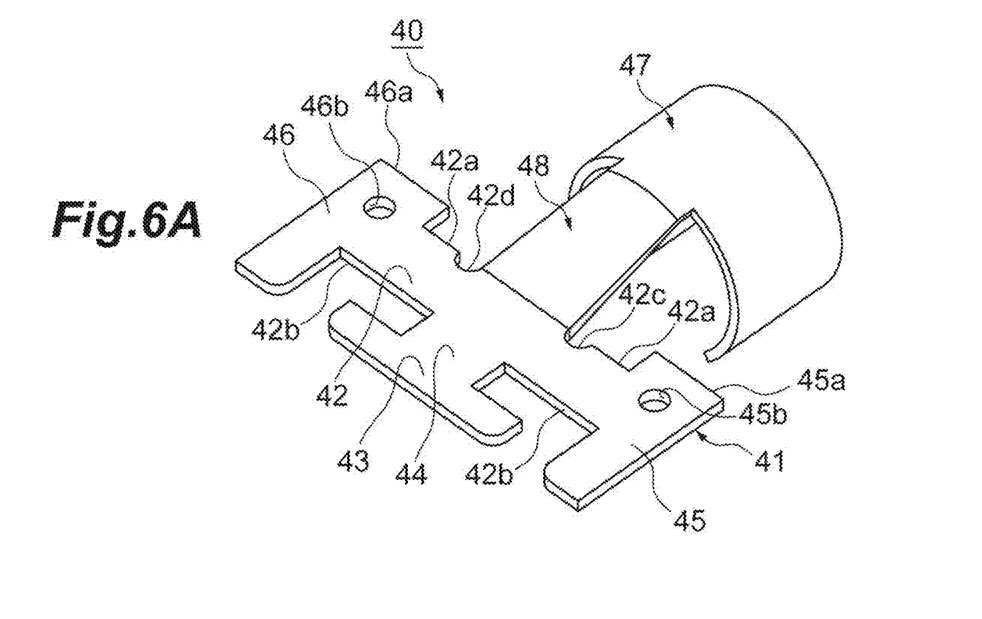
FIG. 6A is a perspective view of an example of a metal member used for the terminal structure illustrated in FIG. 5 seen from above.
Figure 6B:
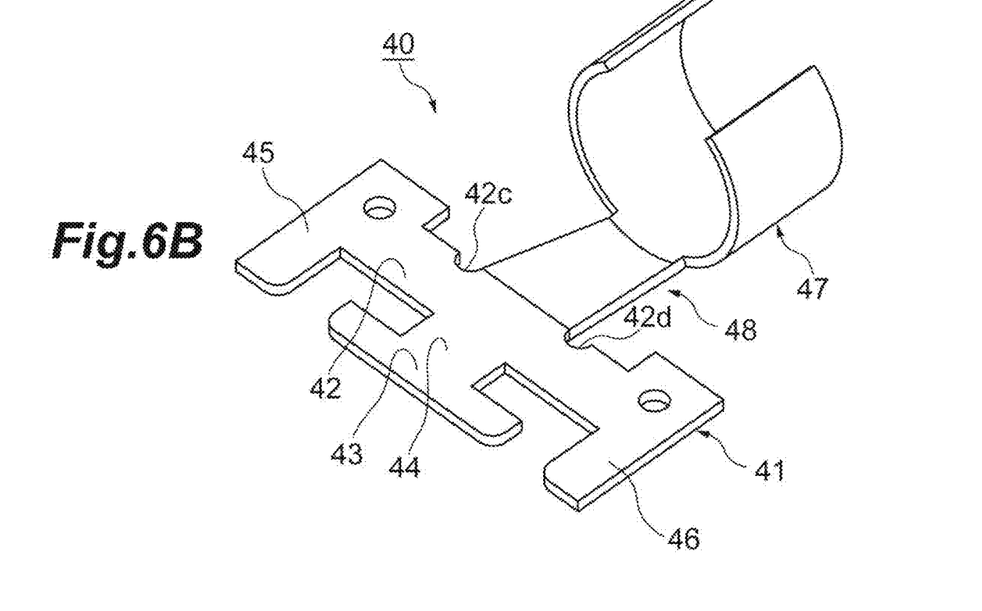
FIG. 6B is a perspective view of the example of the metal member seen from below.

Next, the optical connector cable 1 is described in further detail referring to FIG. 3 to FIGS. 6A and 6B. FIG. 3 is a cross-sectional view of an optical cable along a line in the optical connector cable illustrated in FIG. 1. FIG. 4 is a perspective view illustrating a terminal structure of an optical cable provided with a terminal fixture. FIG. 5 is a perspective view of the terminal structure of the optical cable illustrated in FIG. 4 with a resin member being depicted by a dotted line. FIG. 6A is a perspective view of an example of a metal member used for the terminal structure illustrated in FIG. 5 seen from above, and FIG. 6B is a perspective view of the example of the metal member seen from below.

As illustrated in FIG. 3, the optical cable 20 has a plurality of (here, four) optical fibers 21, a tensile strength fiber 22, a tube 23, a plurality of (here, eight) electric wires 24, a tube 25, and a jacket 26. In the embodiment, the optical fibers 21 are two-dimensionally arranged in two rows and two columns, and respectively extend along the X-axis direction. The optical fibers 21 may be two-dimensionally arranged along a circle, or one-dimensionally in one column. The optical cable 20 may include one optical fiber 21 in place of the optical fibers 21.

The tensile strength fiber 22 is a tensile strength body constituted by ultrafine-diameter aramid fibers collected in a bundle form, for example. Examples of the aramid fibers include Kevlar (registered trademark) fibers. The tensile strength fiber 22 is provided along the optical fiber 21. Since the tensile strength fiber 22 is provided in a state of a predetermined tension being applied thereto, even if the optical cable 20 is pulled in the tensile direction opposite to the end thereof, a stress to be applied thereto firstly applies to the tensile strength fiber 22. Thus, the tensile strength fiber 22 prevents the stress from directly applying to the optical fibers 21 and then protects the optical fibers 21. The tube 23 is provided around the optical fibers 21 and the tensile strength fiber 22 to hold the optical fibers 21 and the tensile strength fiber 22 at predetermined positions.

The plurality of electric wires 24 are provided around the tube 23. The electric wires 24 are two-dimensionally arranged along a circle. The tube 25 is provided around the electric wires 24. The tube 25 holds the plurality of electric wires 24 at predetermined positions. The jacket 26 is a protecting member made of a resin and provided around the tube 25. That is, the jacket 26 surrounds the optical fibers 21, the tensile strength fiber 22, and the like. In this way, the optical cable 20 has the optical fibers 21 and the electric wires 24, and is constituted as an opto-electrical composite cable. The optical cable 20 may include one electric wire 24. Alternatively, the optical cable 20 may not include the electric wire 24.

In the optical cable 20, as illustrated in FIG. 5, parts of the optical fibers 21 and parts of the electric wires 24 are exposed from an end 26a of the jacket 26 and extend outside along the X-axis direction. The tubes 23 and 25 and the jacket 26 surrounding the optical fibers 21 are removed at a part of the optical cable 20 where the optical fibers 21 and the electric wires 24 extend outside from the end 26a. The arrangements of the optical fibers 21 and electric wires 24 change from the two-dimensional arrangements of the optical fibers 21 and electric wires 24 at a portion where the optical fibers 21 and electric wires 24 are surrounded by the jacket 26 and the like, to different arrangements at a terminal portion where the optical fibers 21 and the electric wires 24 extend outside. The optical fibers 21 and the electric wires 24 are one-dimensionally arranged, for example, at the terminal portion of the optical fibers 21 and electric wires 24. Such a configuration allows the optical cable 20 to be easily mounted on the circuit board 3.

The optical fibers 21 adjacent to each other are at predetermined distances at the terminal portion of the optical fibers 21, and the optical fibers 21 are aligned along the Y-axis direction. Here, four optical fibers 21 are arranged such that the distances between the optical fibers 21 adjacent to each other are substantially equal to each other. The electric wires 24 adjacent to each other are at predetermined distances at the terminal portion of the electric wires 24, and the electric wires 24 are aligned along the Y-axis direction. Here, eight electric wires 24 are arranged such that the distances between four electric wires 24 from either end in the Y-axis direction adjacent to each other are substantially equal to each other. In the embodiment, the electric wires 24 are located more upward (in a more positive direction in a Z-axis direction) than the optical fibers 21. In order to arrange the optical fibers 21 and the electric wires 24 at predetermined distances, a positioning part (e.g., a part made of a resin) provided in advance with through-holes at predetermined distances may be separately provided to arrange in order the optical fibers 21, the electric wires 24, or the like in the through-holes of the positioning part.

The terminal fixture 10 has a resin member 30 and a metal member 40 as illustrated in FIGS. 4 and 5. The metal member 40 is a member made of a metal (e.g., made of SUS) and attached to the optical cable 20 or the jacket 26. The metal member 40 is formed by die-cutting a metal plate and bending the die-cut metal plate, for example. The metal member 40 has a length of about 7.5 mm to 9.0 mm in the X-axis direction, for example. The metal member 40 is fixed to the end of the optical cable 20 with a part of the metal member 40 being swaged (crimped) to the end of the jacket 26. The tensile strength fiber 22 extending outside from the end 26a of the jacket 26 is wound around the metal member 40. In this way, the metal member 40 is fixed to the optical cable 20 and the tensile strength fiber 22 is wound around the metal member 40, which allows the metal member 40 to hold the tensile strength fiber 22 in state of maintaining the tension to the tensile strength fiber 22.

The metal member 40 has a winding structure 41, a swaging structure 47, and a coupling portion 48 as illustrated in FIG. 5 and FIGS. 6A and 6B. The coupling portion 48 couples the winding structure 41 with the swaging structure 47, and the winding structure 41 is positioned outside from the end 26a of the jacket 26 along the X-axis direction. The swaging structure 47, the coupling portion 48, and the winding structure 41 are provided in this order from the end of the jacket 26 along the X-axis direction.

The winding structure 41 is a structure on which the tensile strength fiber 22 is wound. The winding structure 41 is arranged more upward than the electric wires 24. The winding structure 41 is provided at a location corresponding to the portion where the two-dimensional arrangement of the optical fibers 21 or the electric wires 24 changes to the one-dimensional arrangement. The winding structure 41 is embedded in the resin member 30. In other words, the winding structure 41 is surrounded and covered by the resin member 30 in a state of being in contact with the resin member 30. The winding structure 41 includes a winding main body 42, a beam portion 43, a juncture portion 44 connecting the beam portion 43 to the winding main body 42, and a pair of projecting portions 45 and 46. The winding main body 42, the beam portion 43, and the juncture portion 44 are positioned at a center in the Y-axis direction. The winding main body 42, the beam portion 43, the juncture portion 44, and the projecting portions 45 and 46 constitute a plate-shaped member provided to be flush with each other on a plane (X-Y plane) perpendicular to the Z-axis direction, which gives an easy configuration.

The winding main body 42 is a portion on which the tensile strength fiber 22 is mainly wound. The winding main body 42 extends along the Y-axis direction. An end of the coupling portion 48 connects to substantially a center of an edge 42a of the winding main body 42 extending along the Y-axis direction. An end of the juncture portion 44 connects to substantially a center of an edge 42b opposite to the edge 42a of the winding main body 42. A pair of cutout portions 42c and 42d are formed on the edge 42a. The pair of cutouts 42c and 42d are formed near the end of the coupling portion 48. A cutout or a recess may be provided to the edge 42b. In the embodiment, the edges 42a and 42b are longer than a length of the swaging structure 47 in the Y-axis direction in a planar view and the edge 42b is longer than the edge 42a. Recesses for ensuring spaces on which the tensile strength fiber 22 is wound are formed between the edge 42b of the winding main body 42 and the beam portion 43 on both sides of the juncture portion 44 in the Y-direction.

On the winding main body 42 having such a configuration, the tensile strength fiber 22 is wound across the edges 42a and 42b on both the ends in the X-axis direction as illustrated in FIG. 5. The tensile strength fiber 22 is divided into two bundles, which are wound around the winding main body 42 to be substantially parallel to the X-axis direction, for example. The phrase "substantially parallel" herein refers to a case where an angle to the X-axis direction is in a range of ±5 degree-angle, for example.

The beam portion 43 is connected to the winding main body 42 via the juncture portion 44 extending along the X-axis direction. The other end opposite to the end of the juncture portion 44 connecting to the winding main body 42 connects to substantially a center of the beam portion 43. The beam portion 43 extends along the Y-axis direction. A width of the beam portion 43 in the Y-axis direction is larger than a width of the juncture portion 44 in the Y-axis direction, and smaller than a width of the winding main body 42 in the Y-axis direction (lengths of the edges 42a and 42b).

A width of the beam portion 43 in X-axis direction is smaller than a length of the juncture portion 44 in the X-axis direction. An edge of the beam portion 43 farthest from the end 26a in the X-axis direction is positioned at substantially the same as leading edges of the projecting portions 45 and 46 opposite to the leading edges 45a and 46a. By providing the beam portion 43, the tensile strength fiber 22 can be held in the recesses between the beam portion 43 and the winding main body 42 in winding the tensile strength fiber 22 on the winding main body 42, which can prevent the winding from coming loose. The beam portion 43 may not be provided in order to simplify the work of winding the tensile strength fiber 22. In this way, in the winding structure 41 (metal member 40), areas partitioned by the winding main body 42, the beam portion 43, the juncture portion 44, and the projecting portions 45 and 46 are formed.

The projecting portions 45 and 46 are respectively provided to the both ends of the winding main body 42 in the Y-axis direction. The projecting portions 45 and 46 have configurations the same as each other, and configurations of the projecting portions 45 and 46 are symmetric about a virtual line through substantially a center of the winding main body 42 and extending in the X-axis direction. The projecting portions 45 and 46 extend in the X-axis direction, and are longer than a length of the winding main body 42 in the X-axis direction. A width of an end of each of the projecting portions 45 and 46 closer the end 26a in the Y-axis direction is larger than a width of an end of each of the projecting portions 45 and 46 farther from the end 26a in the Y-axis direction. The leading edges 45a and 46a of the projecting portions 45 and 46 closer to the end 26a may be exposed from a lateral face 32a of the resin member 30. Through-holes 45b and 46b penetrating through the projecting portions 45 and 46 are formed on the projecting portions 45 and 46, respectively along the Z-axis direction.

The swaging structure 47 is a part that swags the metal member 40 to the jacket 26 to be fixed to the optical cable 20. The swaging structure 47 is a cylinder-like member having a predetermined length in the X-axis direction and having an arc-shaped (circular-shaped) cross-section seen in the X-axis direction. In the embodiment, the swaging structure 47 has the circular-shaped cross-section a part of which is cut out, but may have a circular-shaped cross-section without a cut out portion. An inner periphery of the swaging structure 47 has a size substantially the same as an outer periphery of the jacket 26. In other words, the centers of the swaging structure 47 and jacket 26 are substantially the same as each other seen in the X-axis direction. The swaging structure 47 is swaged by the worker, for example, in a state that swaging structure 47 is embedded at the end of jacket 26 such that the metal member 40 is attached to the optical cable 20.

The coupling portion 48 connects the winding main body 42 of the winding structure 41 with the swaging structure 47. An end of the coupling portion 48 in the X-axis direction connects to an upper portion of the swaging structure 47, and the other end of the coupling portion 48 in the X-axis direction connects to the winding main body 42 (the edge 42a). The coupling portion 48 has a predetermined length longer than the swaging structure 47 in the X-axis direction, for example, about 2.0 mm to 3.5 mm in the X-axis direction. The coupling portion 48 has such a length so that a configuration is given in which an external force applied to the swaging structure 47 is hard to be transmitted to the winding structure 41. The coupling portion 48 extends sloping with a height thereof decreasing from the upper portion of the swaging structure 47 toward the edge 42a of the winding main body 42. In other words, the coupling portion 48 extends with a slop toward the central axis of the optical cable 20 along the X-axis direction. A height of the winding structure 41 is lower than the upper portion of the swaging structure 47 connecting to the coupling portion 48.

The resin member 30 is a member made of a resin and holding the end of the optical cable 20, the optical fibers 21, the electric wires 24, and the metal member 40 as illustrated in FIG. 4 and FIG. 5. The resin member 30 surrounds the end of the optical cable 20, a part of each of the optical fibers 21, a part of each of the electric wires 24, and most of the metal member 40. The resin member 30 is formed such that portions of the metal member 40 except for those near the leading edges 45a and 46a and the through-holes 45b and 46b of the projecting portions 45 and 46 are embedded in the resin member 30. The resin member 30 is formed by injection-molding a predetermined resin (e.g., polyamide resin), for example.

The resin member 30 includes an optical fiber holding portion 31, main body 32, and a swage covering portion 33. The swage covering portion 33, the main body 32, and the optical fiber holding portion 31 are formed in this order from the end of the jacket 26 toward the outside.

The main body 32 covers the winding structure 41 of the metal member 40 and the end of the coupling portion 48. That is, the winding structure 41 and the end of the coupling portion 48 are embedded in the main body 32. As illustrated in FIG. 4, the main body 32 is formed into substantially a rectangular parallelepiped shape. A length of the main body 32 in the X-axis direction is longer than a length of the winding structure 41 in the X-axis direction (a distance between outer side edges of each of the projecting portions 45 and 46). A length of the main body 32 in the Y-axis direction is longer than a length of the winding structure 41 in the Y-axis direction (a distance between an outer edge of the projecting portion 45 and an outer edge of the projecting portion 46). A height of the main body 32 is larger than a distance between the plurality of optical fibers 21 and the winding structure 41 in the Z-axis direction. An end on an upper surface of the main body 2 farther from the end 26a of the jacket 26 is fainted into a shape not having a corner. The main body 32 includes the lateral face 32a and a lateral face 32b which are perpendicular to the X-axis direction. As described above, the leading edges 45a and 46a of the projecting portions 45 and 46 may be exposed from the lateral face 32a facing the end 26a of the jacket 26. The electric wires 24 extend from an upper portion of the lateral face 32b toward the outside, and the optical fiber holding portion 31 extends from a lower portion of the lateral face 32b toward the outside. The main body 32 covers each of the electric wires 24, and therefore, holds the electric wires 24 while defining the position of each of the electric wires 24.

The optical fiber holding portion 31 holds the plurality of optical fibers 21. The optical fiber holding portion 31 has a predetermined thickness in the Z-axis direction and is formed into a plate shape. For example, the thickness of the optical fiber holding portion 31 in the Z-axis direction is about one-third of the height of the main body 32. A length of the optical fiber holding portion 31 in the X-axis direction is shorter than the length of the main body 32 in the X-axis direction. A length of the optical fiber holding portion 31 in the Y-axis direction is longer than a length of the beam portion 43 in the Y-axis direction and shorter than the length of the winding structure 41 in the Y-axis direction. A leading edge of the optical fiber holding portion 31 is depressed toward the end 26a of the jacket 26, and the optical fibers 21 extend from the recess of the leading edge of the optical fiber holding portion 31 toward the outside. The main body 32 covers each of the optical fibers 21, and therefore, holds the optical fibers 21 while defining the position of each of the optical fibers 21.

The swage covering portion 33 covers the swaging structure 47 and most of the coupling portion 48 of the metal member 40. The swage covering portion 33 is formed into a cylindrical shape of which a cross-section perpendicular to the X-axis direction is a circle. The swage covering portion 33 extends from the lateral face 32a of the main body 32 to a direction toward the end 26a of the jacket 26 along the X-axis direction. A length of the swage covering portion 33 in the X-axis direction is equal to a distance between an end of the swaging structure 47 farther from the end 26a and the lateral face 32a of the main body part 32. In the swage covering portion 33, a center of the swage covering portion 33 is positioned at a position substantially the same as a center of the jacket 26 and swaging structure 47 seen in the X-axis direction. An outer diameter of the swage covering portion 33 is larger than an outer diameter of the swaging structure 47.

Figure 7A:
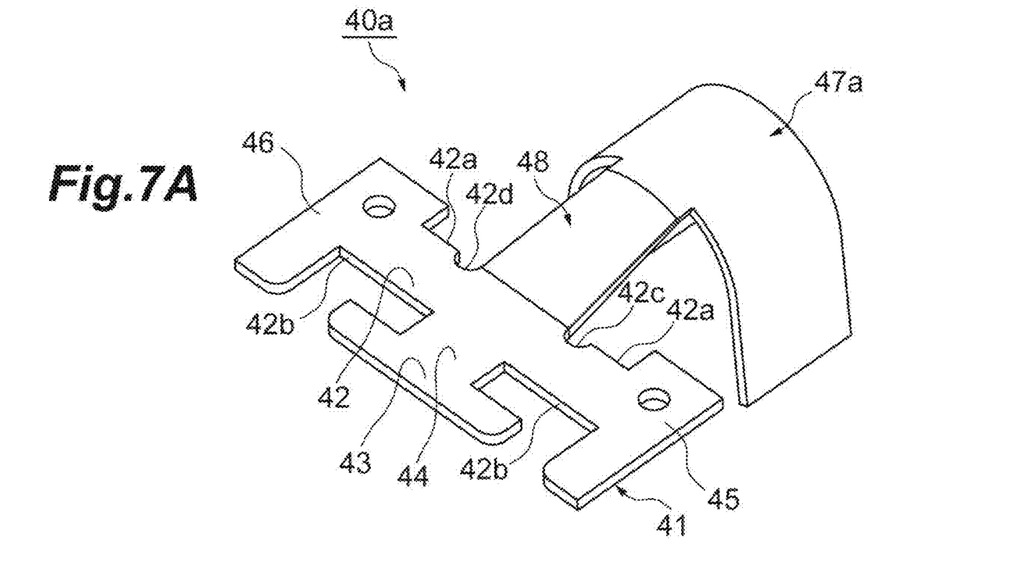
FIG. 7A is a perspective view of another example of the metal member used for the terminal structure illustrated in FIG. 5 seen from above.
Figure 7B:
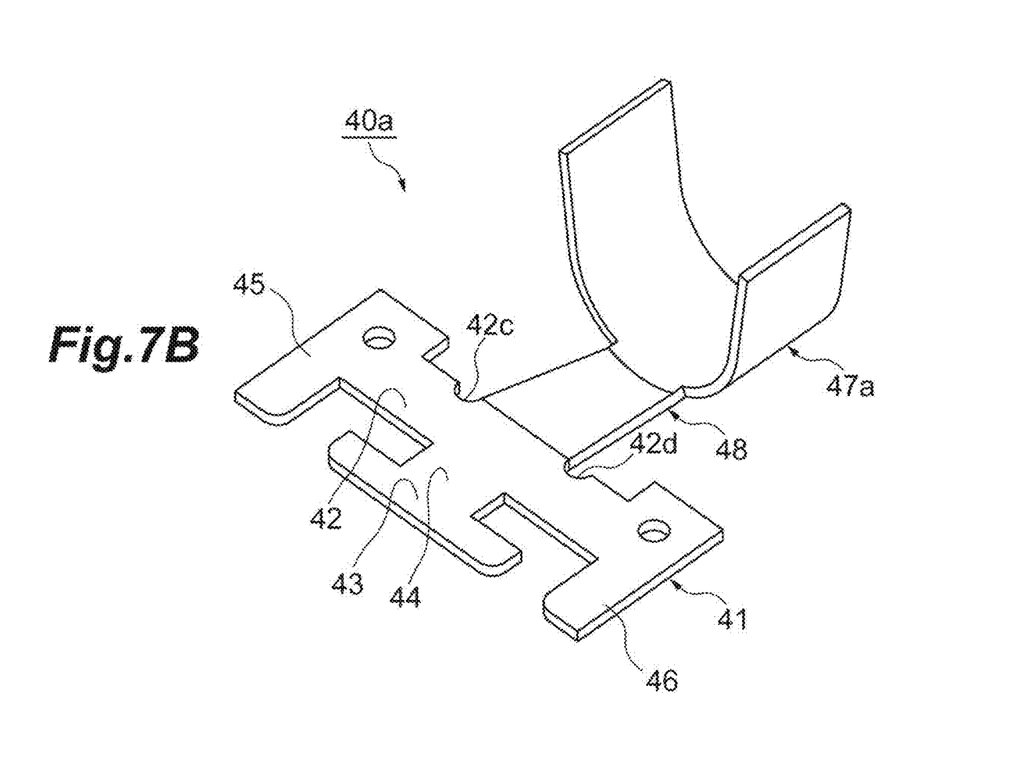
FIG. 7B is a perspective view of the example of the metal member seen from below.
Figures 8A, 8B:
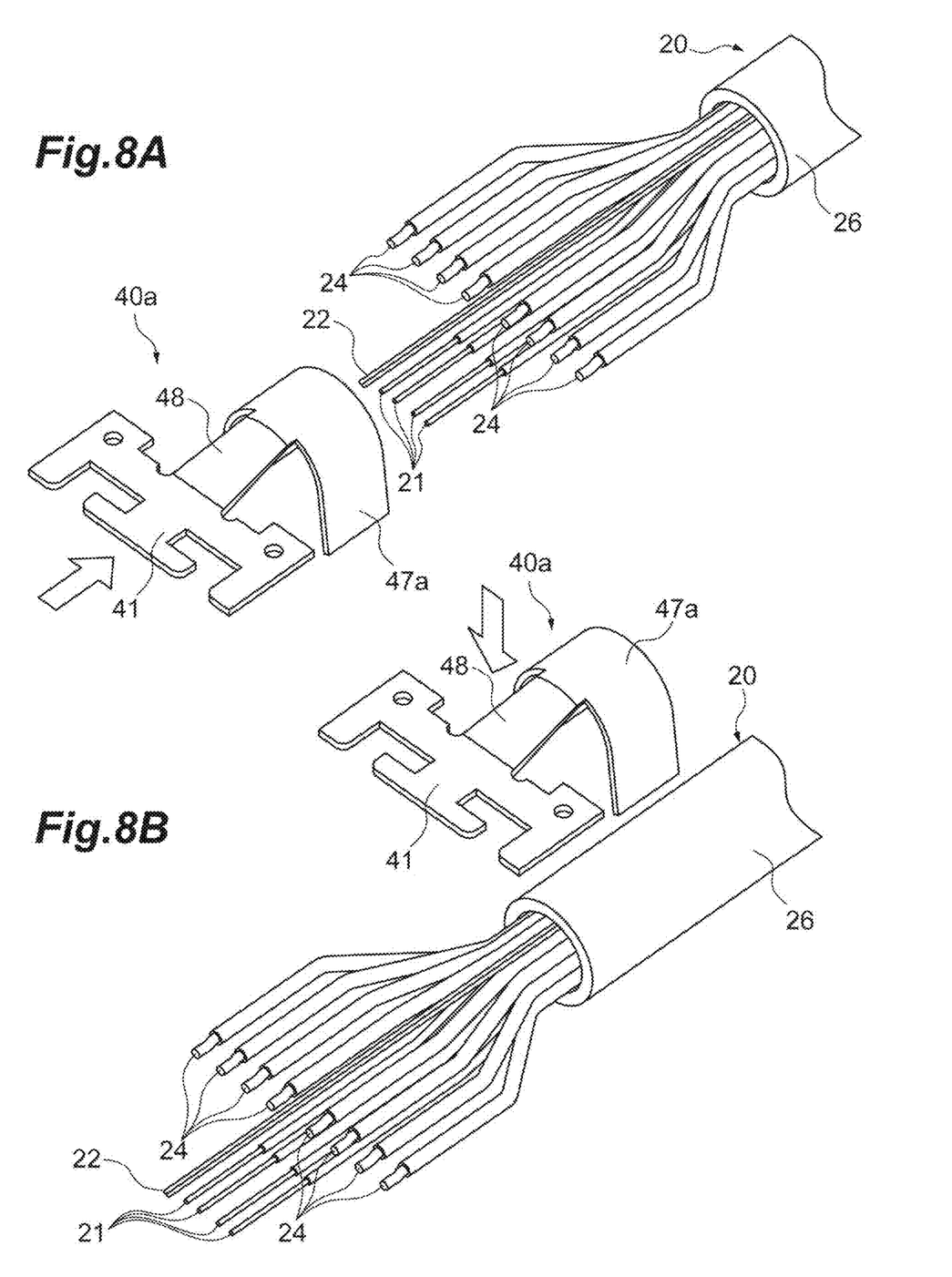
FIG. 8A is a perspective view illustrating an example of a method for attaching the metal member illustrated in FIG. 7A and FIG. 7B to an optical cable.
FIG. 8B is a perspective view illustrating another example of the method for attaching the metal member illustrated in FIG. 7A and FIG. 7B to the optical cable.
Figure 9A:
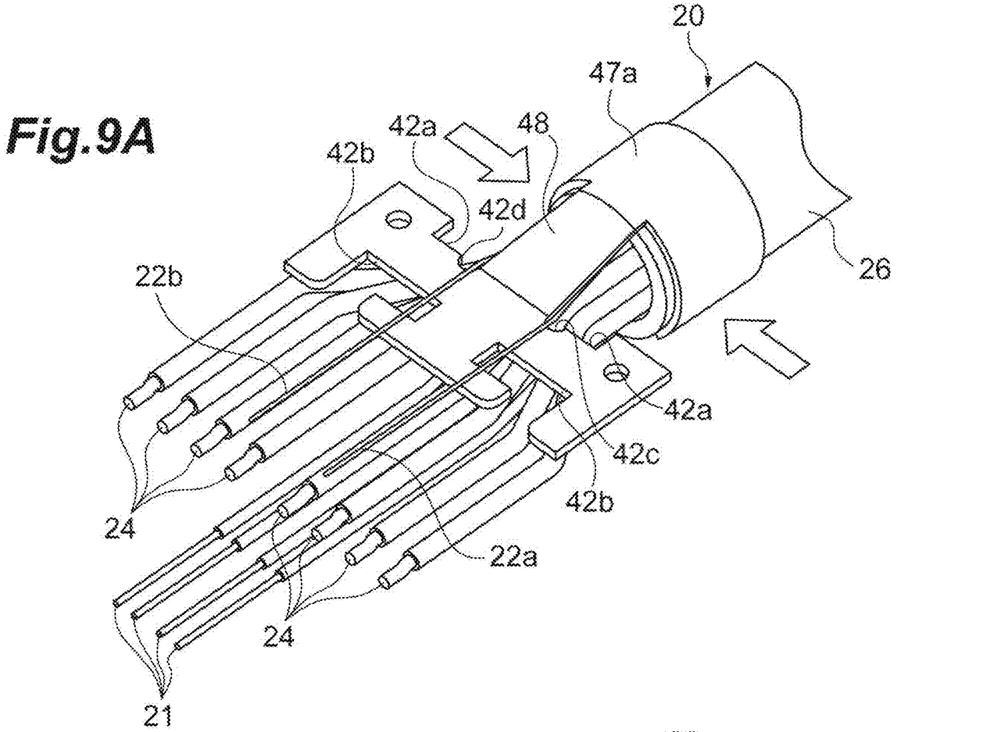
FIG. 9A is a perspective view illustrating a method for fixing the metal member by swaging after attached to the optical cable.
Figure 9B:
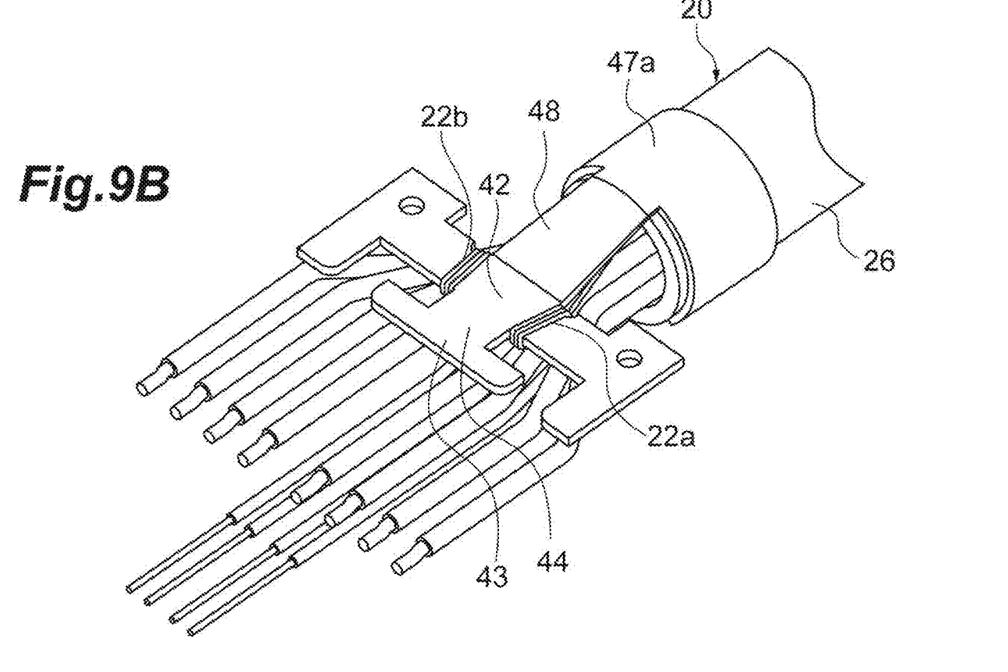
FIG. 9B is a perspective view illustrating an example of a method for winding tensile strength fibers of the optical cable on the metal member.

Here, a description is given of a method for attaching the metal member to the optical cable and applying a predetermined tension to the tensile strength fiber referring to FIG. 7A and FIG. 7B to FIG. 9A, and FIG. 9B. FIG. 7A is a perspective view of another example of the metal member used for the terminal structure illustrated in FIG. 5 seen from above, and FIG. 7B is a perspective view of the example of the metal member seen from below. FIG. 8A is a perspective view illustrating an example of a method for attaching the metal member illustrated in FIG. 7A and FIG. 7B to an optical cable, and FIG. 8B is a perspective view illustrating another example of the method for attaching the metal member illustrated in FIG. 7A and FIG. 7B to the optical cable. FIG. 9A is a perspective view illustrating a method for fixing the metal member by swaging after attached to the optical cable. FIG. 9B is a perspective view illustrating an example of a method for winding the tensile strength fiber of the optical cable on the metal member. A metal member 40a illustrated in FIG. 7A and FIG. 7B is different from the metal member 40 in including a swaging portion 47a having a U-shaped cross-section, but other configurations such as configurations of the winding structure 41, the coupling portion 48 and the like are the same as those of the metal member 40. The swaging portion 47a has the U-shaped cross-section so that the attachment to the optical cable 20 is easier.

In attaching the metal member 40a to the optical cable 20, first, the tubes 23 and 25 and the jacket 26 on an end of the optical cable 20 are removed by predetermined lengths, and then, the optical fibers 21, the electric wires 24, and the tensile strength fiber 22 are made to extend outside from the end 26a of the jacket 26. Subsequently, after the optical cable 20 in which leading ends of the optical fibers 21, the electric wires 24 and the tensile strength fiber 22 are exposed outside is prepared, the metal member 40a is moved to a direction pointed by an arrow as illustrated in FIG. 8A such that an end of the optical cable 20 passes through the inside of the U-shape of the swaging portion 47a of the metal member 40a. Then, the metal member 40 is moved to a location where the swaging portion 47a of the metal member 40a is positioned on an outer periphery of the end of the jacket 26 of the optical cable 20. In order to attach the metal member 40a to the optical cable 20, the metal member 40a may be put from above on the optical cable 20 as illustrated in FIG. 8B.

After the metal member 40a is arranged at a predetermined position with respect to the optical cable 20, the swaging portion 47a is swaged on the outer periphery of the end of the jacket 26, as illustrated in FIG. 9A. After that, the tensile strength fiber 22 is divided into two bundles 22a and 22b, for example, as illustrated in FIG. 9A, and the respective bundles 22a and 22b are arranged to pass from both ends of the coupling portion 48 of the metal member 40a on an upper surface of the winding structure 41 (winding main body 42). At this time, the bundles 22a and 22b of the tensile strength fiber 22 are respectively positioned on the cutouts 42e and 42d provided to the edge 42a of the winding main body 42. Subsequently, the bundles 22a and 22b of the tensile strength fiber 22 are wound across the edges 42a and 42b of the main body 42 to be substantially parallel to the X-axis direction that is an extending direction of the optical cable 20. This can allow the respective bundles 22a and 22b of the tensile strength fiber 22 to be wound around the metal member 40a to apply a predetermined tension to the tensile strength fiber 22 as illustrated in FIG. 9B.

After the tensile strength fiber 22 is wound around the metal member 40a such that a predetermined tension can be applied thereto, the end of the optical cable 20 is arranged in a mold having a positioning mechanism and pins. The positioning mechanism holds the leading ends of the optical fibers 21 and the leading ends of the electric wires 24 at desired positions, and the pins engage with the through-holes 45b and 46b. At this time, the optical fibers 21, the electric wires 24, and the metal member 40 are held at predetermined positions in the mold. Subsequently, a space formed in the mold is filled with a molding resin, and the optical cable 20 for which the resin member 30 is formed is taken out after a predetermined cooling period elapses. As described above, a terminal of the optical cable 20 can be fixed with almost no variation of the tension to the tensile strength fiber 22. Then, the terminal fixture 10 configured in this way, the optical fibers 21, the electric wires 24 and the like are mounted on the circuit board 3 and housed in the housing members 5 and 6 to obtain the optical connector cable 1.

As described above, the optical connector cable 1 according to the embodiment provides the winding structure 41 winding the extending portion of the tensile strength fiber 22 of the optical cable 20 in the metal member 40, and positions the winding structure 41 outside from the end 26a of jacket 26 of the optical cable 20 along the X-axis direction. According to this configuration, the winding structure is positioned in a direction toward which the tensile strength fiber 22 of the optical cable 20 extends outside from the end 26a of the jacket 26, and the tensile strength fiber 22 is wound directly on the winding structure 41. Thus, it is not necessary to apply an unnecessary external force to the winding structure 41 and the like. Therefore, the tension to the tensile strength fiber 22 of the optical cable 20 can be stabilized. In other words, the tension to the tensile strength fiber 22 can be prevented from varying for each product in the optical connector cable 1. In addition, since the winding structure 41 is positioned, directly outside from the end 26a of the jacket 26 along the X-axis direction, the work of winding the tensile strength fiber 22 on the metal member 40 can be easily made in this optical connector cable 1. Thus, this embodiment makes it easier to set the tension to the tensile strength fiber 22 of the optical cable 20 to a desired value. As described above, the optical connector cable 1 can be stably provided in which the optical fibers 21 are preferably protected by the tensile strength fiber 22 having a desired tension.

In the optical connector cable 1, the tensile strength fiber 22 is wound around the winding structure 41 to be substantially parallel to the X-axis direction. Since the tensile strength fiber 22 is easy to wind on the winding structure 41 of the metal member 40 according to this configuration, the tension to the tensile strength fiber 22 can be easily set to a desired value.

In the optical connector cable 1, the winding structure 41 is a plate-shaped portion provided with the cutouts 42c and 42d, the recesses on lateral portions of the juncture portion 44, and the like. This configuration can hold the tensile strength fiber 22 on the winding structure of the metal member 40 using a simple configuration.

In the optical connector cable 1, the metal member 40 has the swaging structure 47 fixing the metal member 40 to the optical cable 20 and the coupling portion 48 coupling the swaging structure 47 to the winding structure 41. The swaging structure 47, the coupling portion 48, and the winding structure 41 are provided in this order along the X-axis direction. Since the winding structure 41 on which the tensile strength fiber 22 is wound and the swaging structure 47 are separate bodies in this embodiment, this embodiment prevents the tension to the tensile strength fiber 22 wound around the metal member 40 from varying in association with the work of swaging the metal member 40 to the optical cable 20 or the like. Therefore, this configuration can further stabilize the tension to the tensile strength fiber 22 of the optical cable 20.

In the optical connector cable 1, the swaging structure 47 has a circular-shaped or U-shaped cross-section. According to this configuration, the metal member 40 can be easily attached to the optical cable 20. Since the metal member 40 can be easily attached to the optical cable 20, this configuration can further prevent the tension to the tensile strength fiber 22 wound around the metal member 40 from varying.

The optical connector cable 1 further comprises the resin member 30 covering the end of the optical cable 20 and the metal member 40. Since the tensile strength fiber 22 wound around the metal member 40 is also covered by the resin member 30 according to this configuration, this configuration can prevent the tension to the tensile strength fiber 22 from varying, such as varying over time. Therefore, this embodiment can further stabilize the tension to the tensile strength fiber 22 of the optical cable 20. The resin member 30 like this can be molded, as described above, by casting a molten resin around the metal member 40 or the like using a mold, for example, and therefore, can be created without affecting the tension to the tensile strength fiber 22 wound around the metal member 40.

In the optical connector cable 1, the resin member 30 holds the plurality of optical fibers 21 by covering the optical fibers 21 while defining a position of each of the optical fibers 21. Since the position of each of the optical fibers 21 is defined by the resin member 30 according to this configuration, this configuration can easily achieve positioning of the optical fibers 21 with respect to the connecting part of the circuit board 3.

In the optical connector cable 1, the resin member 30 holds the plurality of electric wires 24 by covering the electric wires 24 while defining a position of each of the electric wires 24. Since the position of each of the electric wires 24 is defined by the resin member 30 according to this configuration, this configuration can easily achieve positioning of the electric wires 24 with respect to the connecting part of the circuit board 3.

The metal member 40 used for the optical connector cable 1 according to the embodiment includes the swaging structure 47, the coupling portion 48, and the winding structure 41. The swaging structure 47 has a circular-shaped or U-shaped cross-section, and extends along the X-axis direction. The coupling portion 48 is coupled to an end of the swaging structure 47, and extends along the X-axis direction. The winding structure 41 has the winding main body 42 extending in the Y-axis direction perpendicular to the X-axis direction, and is coupled to an end of the coupling portion 48 opposite to the swaging structure 47. The cutouts 42c and 42d, the recess, or the like is provided to the winding main body 42 of the winding structure 41. In this way, the metal member 40 can achieve the winding of the tensile strength fiber 22 or the attachment to the optical cable by swaging by use of a simple configuration.

Figures 10A, 10B:
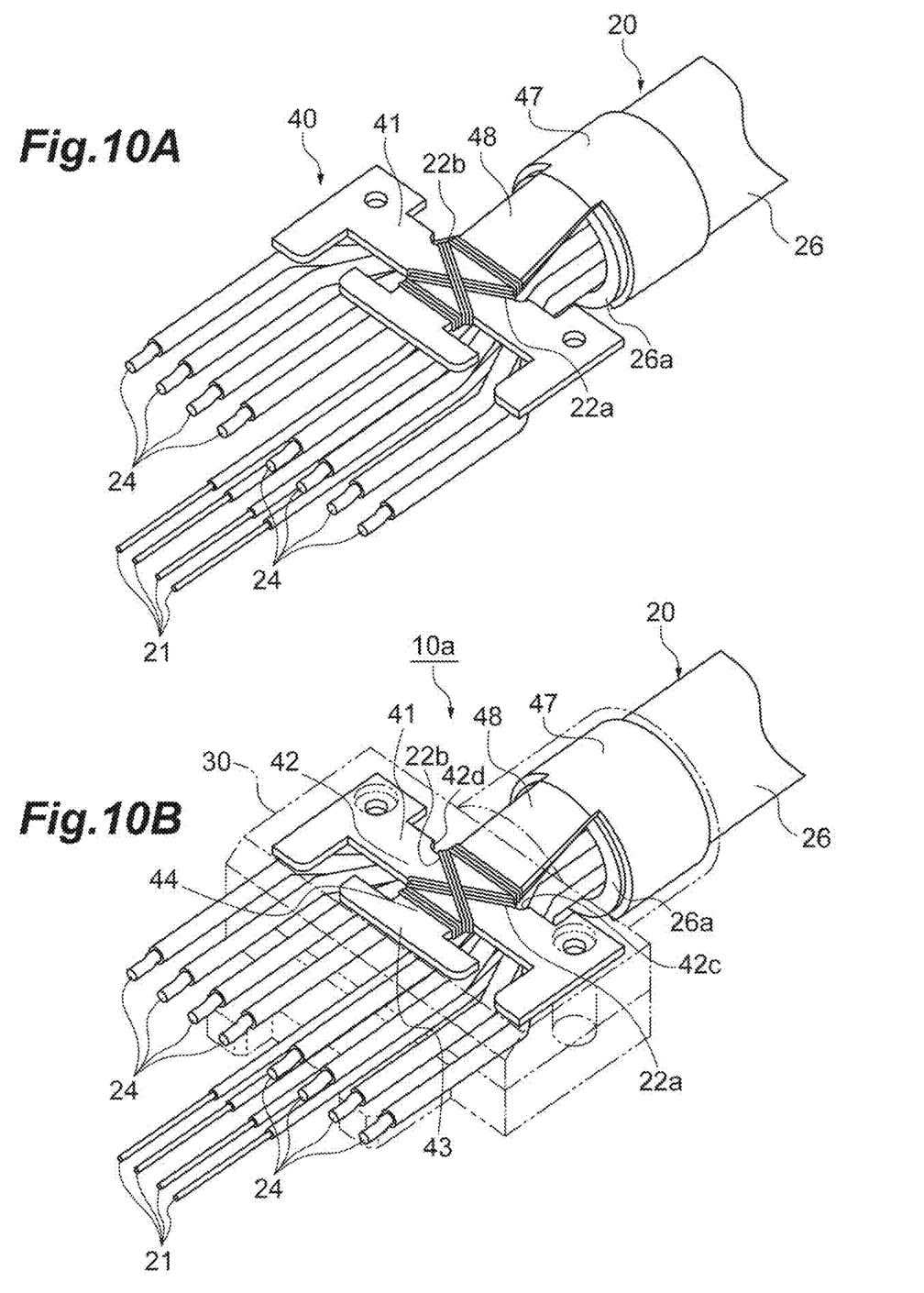
FIG. 10A is a perspective view illustrating another example of the method for winding the tensile strength fiber of the optical cable on the metal member.
FIG. 10B is a perspective view illustrating a state where the optical cable and the metal member in the example illustrated in FIG. 10A are embedded in a resin member.

As described above, the optical connector cable and metal member used for the optical connector cable according to the embodiment are described, but the present invention is not limited to those described above, and various modifications can be applied. For example, a direction in which the tensile strength fiber 22 is wound around the winding structure 41 of the metal member 40 is not limited to the case of being substantially parallel to the X-axis direction. For example, as illustrated in FIG. 10A and FIG. 10B, the respective bundles 22a and 22b of the tensile strength fiber 22 may be wound to intersect each other on the winding structure 41 of the metal member 40. In this case, the tensile strength fiber 22 intersects the X-axis direction (e.g., intersects at an inclined angle of 20 degrees to 70 degrees, or 30 degrees to 60 degrees), and is wound at the edges 42a and 42b of the winding main body 42, in a direction perpendicular to the X-axis direction between the edge 42a and the coupling portion 48 and between the edge 42b and the juncture portion 44. Since the tensile strength fiber 22 can be more reliably held on the winding structure 41 (without displacement or coming loose) in winding the tensile strength fiber 22 on the winding structure 41 of the metal member 40 according to this configuration, the tension to the tensile strength fiber 22 can be set to a more desirable value.

In the embodiment described above, the metal member 40 on which the tensile strength fiber 22 is wound is formed to be covered by the resin member 30, but a configuration not provided with the resin member 30 may be adopted by fixing, using an adhere or the like, the metal member 40 on which the tensile strength fiber 22 is wound. Even in this case, since the swaging structure 47 and the winding structure 41 are arranged as separate bodies apart from each other, and the winding structure 41 is positioned in the extending direction of the tensile strength fiber 22, the tension to the tensile strength fiber 22 is easy to maintain in a predetermined range and can be easily stabilized for each product. Note that so long as the tensile strength fiber 22 can be wound and fixed on the metal member 40 without coming loose, the fixing using an adhere may be omitted.

What is claimed is:

1. An optical connector cable comprising:
    an optical cable that includes an optical fiber extending along a first direction, a tensile strength body provided along the optical fiber, and a jacket surrounding the optical fiber and the tensile strength body in a circumferential direction, wherein the optical fiber and the tensile strength body extend outside from an end of the jacket along the first direction; and
    a metal member having a fixing structure in which the metal member is fixed to the optical cable, a winding structure around which the tensile strength body extending outside from the end of the jacket is wound wherein the winding structure is positioned outside from the end of the jacket along the first direction, and a coupling portion extending along the first direction from the fixing structure wherein a first end of the coupling portion, located on an opposite side of the fixing structure, connects to the winding structure.

2. The optical connector cable according to claim 1, wherein the tensile strength body is wound around the winding structure such that at least a part of the tensile strength body is substantially in parallel to the first direction.

3. The optical connector cable according to claim 1, wherein the tensile strength body is wound around the winding structure such that at least a part of the tensile strength body intersects the first direction.

4. The optical connector cable according to claim 1, wherein the winding structure includes a plate-shaped portion.

5. The optical connector cable according to claim 1, wherein the winding structure includes a plate-shaped portion provided with at least one of a cutout and a recess.

6. The optical connector cable according to claim 1, wherein the winding structure extends along the first direction and a second direction intersecting the first direction.

7. The optical connector cable according to claim 1,
wherein the fixing structure comprises a swaging structure configured to fix the metal member to the optical cable, and the coupling portion couples the swaging structure to the winding structure, and
wherein the swaging structure, the coupling portion, and the winding structure are provided in this order along the first direction.

8. The optical connector cable according to claim 7, wherein the swaging structure has a circular-shaped or U-shaped cross-section.

9. The optical connector cable according to claim 7, wherein the coupling portion is coupled to an end of the swaging structure.

10. The optical connector cable according to claim 7, wherein the coupling portion extends with a slop toward the central axis of the optical cable along the first direction.

11. The optical connector cable according to claim 7, wherein the winding structure includes a winding main body connected to the coupling portion and extending along a second direction intersecting the first direction, a pair of projecting portions each provided to both ends of the winding main body in the second direction, and a beam portion connected to the winding main body opposite to the coupling portion through a juncture portion, the beam portion extending the second direction to be longer than the juncture portion.

12. The optical connector cable according to claim 11, where respective through-holes are provided with the pair of projecting portions, the thorough-holes respectively extending along a third direction intersecting the first direction and the second directions.

13. The optical connector cable according to claim 1, further comprising a resin member that surrounds an end of the optical cable and the metal member therein.

14. The optical connector cable according to claim 13, wherein the optical cable further includes other optical fibers, and the resin member holds the optical fiber and the other optical fibers so as to identify respective locations of the optical fiber and the other optical fibers.

15. The optical connector cable according to claim 13, wherein the optical cable further includes a plurality of electric wires, and the resin member holds the plurality of electric wires so as to identify respective locations of the plurality of electric wires.

* * * * *